US007635446B2

United States Patent
Henley et al.

(10) Patent No.: US 7,635,446 B2
(45) Date of Patent: Dec. 22, 2009

(54) METHOD FOR DEBINDERING CERAMIC HONEYCOMBS

(75) Inventors: John Porter Henley, Midland, MI (US); Avani Maulik Patel, Midland, MI (US); Arthur Richard Prunier, Jr., Midland, MI (US); Chan Han, Midland, MI (US)

(73) Assignee: Dow Global Technologies, Inc., Midland, MI (US)

( * ) Notice: Subject to any disclaimer, the term of this patent is extended or adjusted under 35 U.S.C. 154(b) by 454 days.

(21) Appl. No.: 11/506,720

(22) Filed: Aug. 18, 2006

(65) Prior Publication Data

US 2007/0045911 A1 Mar. 1, 2007

Related U.S. Application Data

(60) Provisional application No. 60/710,583, filed on Aug. 23, 2005.

(51) Int. Cl.
*C04B 33/32* (2006.01)
*F27D 5/00* (2006.01)

(52) U.S. Cl. .................. 264/630; 264/656; 432/258

(58) Field of Classification Search ............ 264/630, 264/656; 438/258; 432/258
See application file for complete search history.

(56) References Cited

U.S. PATENT DOCUMENTS

| | | | |
|---|---|---|---|
| 4,001,028 A | 1/1977 | Forst et al. | |
| 4,162,285 A | 7/1979 | Tanabashi | |
| 4,786,542 A * | 11/1988 | Yasuda et al. | 428/116 |
| 4,837,943 A * | 6/1989 | Mizutani | 34/250 |
| 4,927,577 A | 5/1990 | Ohtaka et al. | |
| 4,929,575 A | 5/1990 | Khoury et al. | |
| 5,021,204 A * | 6/1991 | Frost et al. | 264/630 |
| 5,034,023 A * | 7/1991 | Thompson | 205/634 |
| 5,064,609 A * | 11/1991 | Harada et al. | 419/58 |
| 5,098,455 A | 3/1992 | Doty et al. | |
| 5,173,349 A | 12/1992 | Yayuz et al. | |
| 5,194,154 A | 3/1993 | Moyer et al. | |
| 5,198,007 A | 3/1993 | Moyer et al. | |
| 5,286,767 A | 2/1994 | Rohrbach et al. | |
| 5,316,710 A * | 5/1994 | Tasaki et al. | 264/630 |
| 5,340,516 A | 8/1994 | Yavuz et al. | |
| 5,344,799 A | 9/1994 | Wu | |
| 5,529,732 A * | 6/1996 | Ideguchi et al. | 264/607 |
| 5,568,652 A | 10/1996 | Wu | |
| 5,925,308 A | 7/1999 | Fewkes et al. | |

(Continued)

FOREIGN PATENT DOCUMENTS

EP  1142619 A1  10/2001

(Continued)

OTHER PUBLICATIONS

Chapters 9-12 of *Introduction to the Principles of Ceramic Processing*, J.S. Reed, John Wiley and Sons, New York, NY, 1988.

*Primary Examiner*—Joseph S. Del Sole
*Assistant Examiner*—Robert Dye

(57) ABSTRACT

An organic additive is removed from a ceramic honeycomb by an improved method by contacting each end of the extruded honeycomb with a member that has a gas permeability no greater than the outer wall, the member essentially covering the ends and heating the honeycomb to a temperature sufficient to remove the organic additive.

11 Claims, 3 Drawing Sheets

U.S. PATENT DOCUMENTS

| | | | |
|---|---|---|---|
| 6,080,345 | A | 6/2000 | Chalasani et al. |
| 6,099,793 | A | 8/2000 | Dull et al. |
| 6,241,940 | B1 | 6/2001 | Beal et al. |
| 6,287,509 | B1 | 9/2001 | Gheorghiu |
| 6,287,510 | B1 * | 9/2001 | Xun .......................... 264/630 |
| 6,306,335 | B1 | 10/2001 | Wallin et al. |
| 6,539,644 | B1 * | 4/2003 | Araya ........................ 34/259 |
| 6,596,665 | B2 | 7/2003 | Wallin et al. |
| 6,669,751 | B1 | 12/2003 | Ohno et al. |
| 6,680,101 | B1 | 1/2004 | Kato |
| 6,797,666 | B2 | 9/2004 | Harada et al. |
| 6,803,015 | B2 * | 10/2004 | Vance et al. ................. 264/628 |
| 2001/0038810 | A1 | 11/2001 | Wallin et al. |
| 2004/0020359 | A1 | 2/2004 | Koermer et al. |
| 2004/0079469 | A1 | 4/2004 | Chan et al. |

FOREIGN PATENT DOCUMENTS

| | | |
|---|---|---|
| WO | WO03/051488 A1 | 6/2003 |
| WO | WO03/082773 | 10/2003 |
| WO | WO2004/011124 A1 | 2/2004 |
| WO | WO2004/011386 A1 | 2/2004 |

* cited by examiner

METHOD FOR DEBINDERING CERAMIC HONEYCOMBS

CROSS-REFERENCE TO RELATED APPLICATION

This application claims the benefit of U.S. Provisional Application Ser. No. 60/710,583, filed Aug. 23, 2005, which is hereby incorporated by reference.

FIELD OF THE INVENTION

The invention relates to the formation of ceramic honeycombs. In particular, the invention relates to an improved method of removing organic binders and additives from extruded ceramic honeycombs.

BACKGROUND OF THE INVENTION

To form ceramic honeycombs useful for applications such as catalytic converters and diesel particulate filters (DPFs), ceramic particulate precursors are mixed with organic additives (e.g., binders and lubricants) and a liquid medium, which is typically water to form a plastic material. The plastic material is then extruded to form the honeycomb shape, which is subsequently dried to remove the water. The dried honeycomb is then heated to remove the organic additives. After removal of the organic additives the honeycomb is heated to a higher temperature to fuse the ceramic grains so that the honeycomb has the mechanical integrity and microstructure useful for a catalytic converter or DPF.

The heating to remove the organic additives has typically been done in air or oxygen containing atmospheres. Unfortunately, the organic additives invariably display an exothermic reaction associated with their oxidation, which results often in cracking of the body due to localized thermal gradients.

To avoid such cracking, inert atmospheres or low oxygen containing atmospheres (i.e., less than oxygen than air) have been used (see, for example, U.S. Pat. Nos. 6,099,793 and 6,287,509). Unfortunately, the use of such atmospheres tends to remove the organic additives more slowly and leave behind deleterious carbonaceous residue, which quite often impedes the fusing of the ceramic grains at higher temperature or results in undesirable microstructures such as large pores that act as defects.

Another solution has been to pass air, oxygen containing atmosphere or other atmosphere through the honeycomb to minimize the thermal gradients associated with the oxidation of the organic additives (see, for example, U.S. Pat. No. 4,927,577). This method suffers from expensive complexity and becomes less useful as the honeycombs become longer.

More recent solutions have involved using 2 or more organic binders where one is subsequently extracted using a liquid for one of the binders and the second binder is removed by heating using a known heating method such as one of those just described (see, for example, U.S. Patent Publication No. 2004/0079469). This method again suffers from complexity and the handling of more fragile part during the liquid extraction of one of the binders.

Accordingly, it would be desirable to provide both a formation method and a ceramic material that solves one or more of the problems of the prior art, such as one of those described above.

SUMMARY OF THE INVENTION

The present invention is a method for removing an organic additive from a ceramic honeycomb, the honeycomb having an outer wall and channels that extend from one end to the other end of the honeycomb, where the channels are defined by a plurality of interlaced thin partition walls between the ends, a) contacting each end of the extruded honeycomb with a member that has a gas permeability no greater than the outer wall, the member essentially covering the ends b) heating the honeycomb to a temperature sufficient to remove the organic additive.

Surprisingly, the use of such members allows for the removal of organic additives from an extruded ceramic honeycomb in an oxidizing atmosphere such as air at fast rates without causing cracking of the honeycomb.

The method may be used, for example, to prepare ceramic honeycombs for use as filters, heat exchangers, refractories, thermal and electrical insulators, reinforcement for composite bodies of metals or plastics, catalysts and catalyst supports.

DETAILED DESCRIPTION OF THE INVENTION

Figure 1:
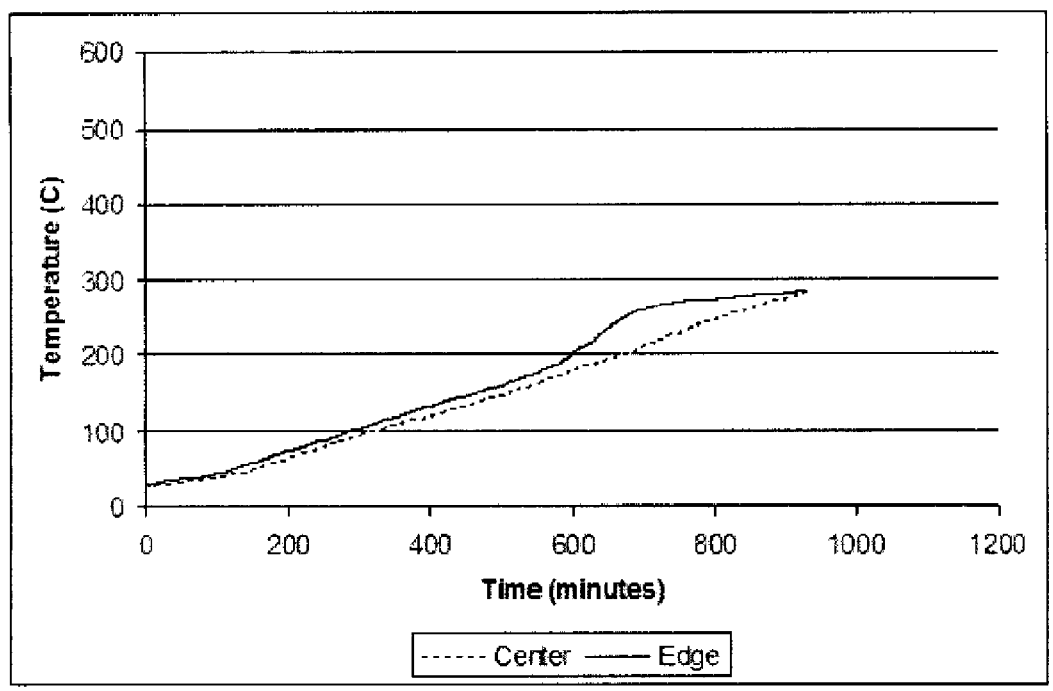
FIG. 1: A plot of the temperature in a channel at the middle and at the edge of a honeycomb measured by a thermocouple inserted to the same depth within the middle and edge channel, for a honeycomb being heated in air with both ends covered by essentially gas impermeable plates (Example).

The invention is a method for removing an organic additive from a ceramic honeycomb. The ceramic honeycomb may be any known in the art that is formed using ceramic powder and an organic additive. Exemplary ceramic honeycombs are those that are or form upon heating alumina, zirconia, niobium titanate, silicon carbide, silicon nitride and aluminum nitride, silicon oxynitride and silicon carbonitride, mullite, cordierite, beta spodumene, aluminum titanate, strontium aluminum silicates, lithium aluminum silicates or combinations thereof. Preferred ceramic honeycombs are those that are or form silicon carbide, cordierite, mullite or combination thereof. The silicon carbide is preferably one described in U.S. Pat. No. 6,669,751B1 and WO publications EP1142619A1, WO 2002/070106A1. Other suitable ceramic honeycombs are described by WO 2004/011386A1, WO 2004/011124A1, US 2004/0020359A1 and WO 2003/051488A1.

The ceramic honeycomb is preferably one that forms a mullite having an acicular microstructure. Examples of such honeycombs include those described by U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773.

The organic additive that is removed may be any known in the art useful to shape ceramic honeycomb bodies such as those known in the art. Broadly, the organic additive may be one or more of surfactants, lubricants, binders, solvents, plasticizers, antioxidants, preservatives, foaming and antifoaming agents such as described by Chapters 9-12 of *Introduction to the Principles of Ceramic Processing*, J. S. Reed, John Wiley and Sons, New York, N.Y., 1988.

In particular, the organic additive is comprised of an organic binder such as one more of those described by U.S. Pat. Nos. 4,001,028; 4,162,285; 4,929,575; 5,286,767; 5,344,799; 5,568,652; 5,925,308; 6,080,345; 6,241,940; and 6,680,101. In a particular embodiment, the organic binder is methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxyethyl methylcellulose, sodium carboxy methylcellulose or mixture thereof. Preferably, the cellulose binder is a cellulose binder described by col., 5, lines 49-67 and col. 6, lines 1-21 of U.S. Pat. No. 5,568,652, incorporated herein by reference.

The ceramic honeycomb may be any shape or size and dimension such as those commonly used in the art as vehicular catalyst supports or Diesel particulate filters.

The extruded ceramic honeycomb, when contacted with a member at each end, may be dried prior to being contacted, or may be contacted as extruded. Typically, the extruded ceramic honeycomb will be substantially dried of a liquid medium such as water. Substantially dried of a liquid medium, generally means that the extruded honeycomb's plasticity has been decreased such that when deformed the honeycomb will crack with little plastic deformation (e.g., 2% deformation before cracking). Typically, this will be when the liquid medium is present in an amount of at most about 5% by volume of the honeycomb (not including the honeycomb's channel volume).

The members contacting (contacting member) the ends of the honeycomb may be positioned in any useful arrangement. For example, the honeycomb may be oriented vertically or horizontally and the ends contacted by a member such that each end is essentially covered. Essentially covered means at least about 90% of the channels are covered by the member. Preferably, at least about 95%, more preferably at least about 98% and most preferably all of the channels are covered by the member.

It has been discovered that when using a contacting member having a gas permeability that is no greater than the outer wall of the honeycomb on each end of the honeycomb during heating to remove organic additives, the maximum temperature difference from the center of the honeycomb to the edge of the honeycomb is substantially reduced during organic binder oxidation (burnout). For example, the maximum temperature difference during burnout between the center of a honeycomb to the edge of the honeycomb at the same depth within the corresponding channel and all other things being equal is decreased, for example, by at least 50% and more typically 70% when using a plate during removal of organic binder using a reactive atmosphere during heating. Surprisingly, the temperature at the center may even be cooler than the edge temperature during burnout of the organic binder whereas the opposite has been found for honeycombs not having such members in contact with both ends.

To reiterate, the contacting member has a gas permeability no greater than the honeycomb's outer wall gas permeability. The gas permeability of the contacting member may, however, have any gas permeability less than the outer wall to no gas permeability. It is understood that the contacting member's gas permeability is that which would be measured in the direction through the contacting member in the direction of the channels of the honeycomb.

The contacting member may be made of any material sufficient to create a member having the aforementioned gas permeability and the ability to withstand the temperature during heating necessary to remove the organic additives within the honeycomb. Suitable materials include ceramics and metals.

When contacting the honeycomb with the contacting member no force other than the amount necessary to maintain the contacting relationship is necessary. For example, the force of gravity is more than sufficient to maintain a plate underneath and on top of end of a honeycomb.

The contacted honeycomb is heated to a temperature sufficient to remove the organic additive. The heating may be done using any suitable heating source such as those known in the art. Examples include convection, radiant, microwave, radio frequency (RF) and combinations thereof.

The atmosphere during heating may be any atmosphere useful to remove the organic additive. For example, the atmosphere may be inert or reactive. The method, however, is particularly suited to when the atmosphere is one that reacts with the organic additive such as an oxidative atmosphere. Examples of atmospheres include nitrogen, noble gases, oxygen or combinations thereof. A preferred atmosphere is air. Typically, the organic additive begins oxidizing about 200° C. and is substantially removed by 400° C. in air, but higher temperatures may be required to remove, for example, residual carbon. The temperature where the organic additive begins to be removed and is essentially removed may be determined without undue experimentation by one of ordinary skill in the art.

The heating may be done at any heating rate or rates useful to remove the organic additive without damaging the honeycomb such as those known in the art or are readily determinable by one of ordinary skill in the art.

EXAMPLES

Example and Comparative Example

Extruded dried ceramic honeycombs comprised of the same alumina, clay and organic binders, were placed in the same two cubic foot air convection oven and heated simultaneously using the heating schedule shown in Table 1.

TABLE 1

| | Heating Schedule | | |
|---|---|---|---|
| Temperature (C.) | Ramp rate (C./hr) | Time (hr:min) | Time (hr) |
| 0-400 | 15 | 26:42:00 | 26.7 |
| 400-650 | 30 | 8:18:00 | 8.3 |
| 650-980 | 50 | 6:36:00 | 6.6 |
| 980 | 0 | 4:00:00 | 4 |
| 980-300 | 90 | 7:34:00 | 7.56 |

The honeycombs were the same size 5.66"×6" long honeycombs having 200 cells per square inch. Each honeycomb was oriented vertically with an end resting upon an ADS-96R alumina plate from Coorstek Inc., Golden, Col., with density of 3.96 g/cm$^3$, no gas permeability, and 0.05 inches in thickness were used, covering entirely the bottom end. One honeycomb (Example) had another alumina plate placed on top of the remaining end completely covering the top end.

Thermocouples were placed about 1.5 inches deep into an edge channel (near the outer wall) and into a center channel at the same depth.

Figure 2:
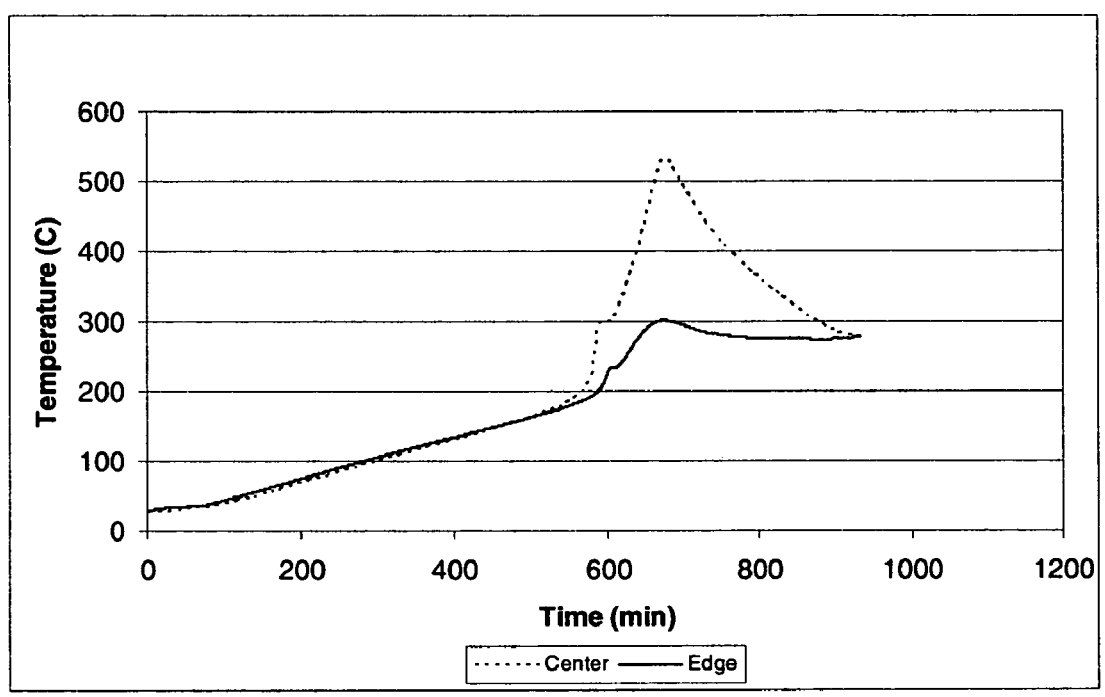
FIG. 2: A plot of the temperature in a channel at the middle and at the edge of a honeycomb measured by a thermocouple inserted to the same depth within the middle and edge channel, for a honeycomb being heated in air with one end being uncovered (Comparative Example).

Upon the beginning of organic binder oxidation (burnout), as shown in FIG. 2 at about 10 hours (600 minutes) corresponding to an oven temperature of about 200° C., the temperature of the center of the honeycomb without plates was substantially greater than the temperature increase of the same honeycomb having alumina plates placed on each end (FIG. 1). Likewise, the temperature difference from the center to the edge of the honeycombs is shown in FIG. 3.

Figure 3:
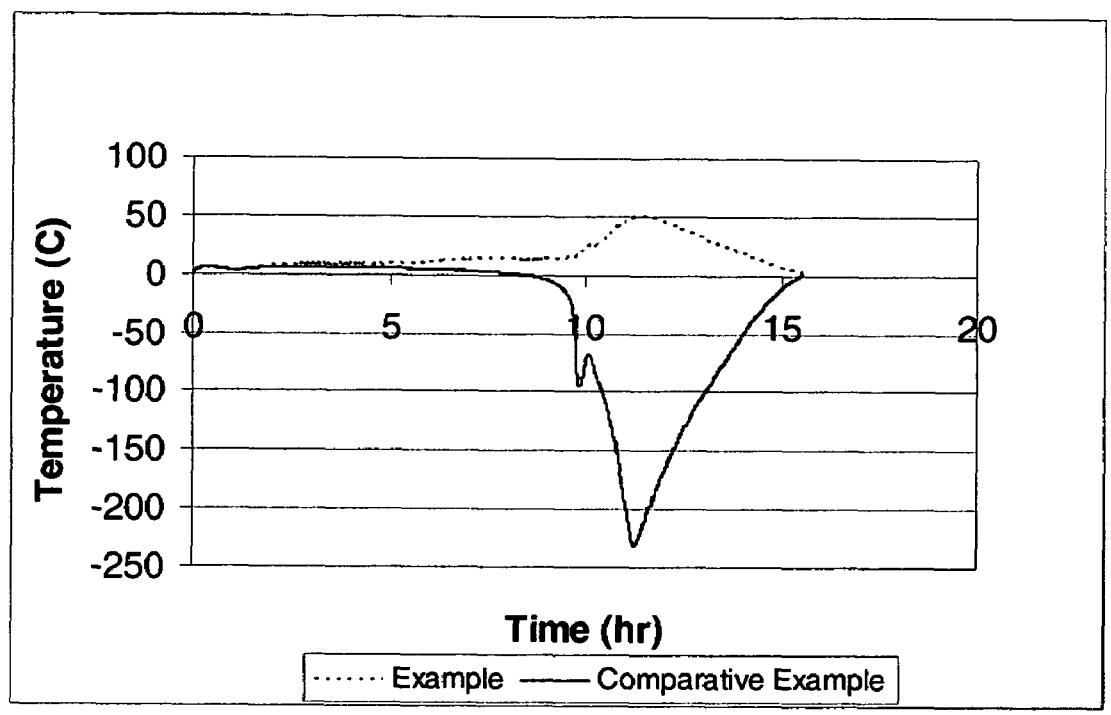
FIG. 3: A plot of the difference in temperature from a center channel to an edge channel (edge channel temperature minus center channel temperature) in honeycombs containing organic binder heated in air in a furnace with plates on each end (Example) and without a plate on one end (Comparative Example).

FIG. 3, shows that the Comparative Example, without the plate covering the top end, resulted in a maximum temperature difference where the center was about 230° C. hotter than the edge, whereas when using alumina plates to completely cover both ends, the center was actually cooler by about 50° C. Upon removal from the furnace after cooling, the Comparative Example broke into three pieces whereas the Example did not and after cutting open the Example honeycomb it was observed that there was no residual carbon.

What is claimed is:

1. A method for removing an organic additive from an extruded ceramic honeycomb, the honeycomb having an outer wall and channels that extend from one end to the other end of the honeycomb, where the channels are defined by a plurality of interlaced thin partition walls between the ends comprising,
    a) contacting each end of the extruded honeycomb with a member that has a gas permeability no greater than the outer wall, the member essentially covering the ends such that all of the channels are covered at each end, said permeability being measured in the direction of the channels through the contacting member and
    b) heating the essentially covered honeycomb to a temperature sufficient to remove the organic additive.
2. The method of claim 1 wherein the heating is performed in an oxidizing atmosphere.
3. The method of claim 2 wherein the oxidizing atmosphere is air.
4. The method of claim 1 wherein the member is a ceramic or metal.
5. The method of claim 3 wherein the member is a ceramic.
6. The method of claim 1 wherein the member has essentially no gas permeability.
7. The method of claim 1 wherein the member is a plate.
8. The method of claim 7 wherein the maximum difference in temperature from a channel in the middle to a channel at the outer periphery of the honeycomb at about the same depth within the channels is at least 50% less than the maximum difference in temperature of a honeycomb failing to have the members covering the both ends within the temperature range where the organic additive is oxidized.
9. The method of claim 1, wherein the temperature in a channel in the middle of the honeycomb has a cooler temperature than a channel at the outer periphery of the honeycomb within the temperature range where the organic additive is oxidized.
10. The method of claim 1, wherein the organic additive is comprised of an organic binder.
11. The method of claim 10, wherein the organic binder is methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxyethyl methylcellulose, sodium carboxy methylcellulose or mixture thereof.

* * * * *